(12) United States Patent
Kalevo

(10) Patent No.: US 7,468,752 B2
(45) Date of Patent: Dec. 23, 2008

(54) CAMERA OUTPUT FORMAT FOR REAL TIME VIEWFINDER/VIDEO IMAGE

(75) Inventor: Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 800 days.

(21) Appl. No.: 10/692,305

(22) Filed: Oct. 23, 2003

(65) Prior Publication Data

US 2005/0088560 A1    Apr. 28, 2005

(51) Int. Cl.
*H04N 5/222* (2006.01)

(52) U.S. Cl. ............... 348/333.11; 348/211.12; 348/220.1

(58) Field of Classification Search ......... 348/333.01, 348/333.11, 333.12, 211.1, 211.2, 211.12, 348/220.1, 453–459
See application file for complete search history.

(56) References Cited

U.S. PATENT DOCUMENTS

| | | | |
|---|---|---|---|
| 6,292,218 B1 * | 9/2001 | Parulski et al. | 348/220.1 |
| 6,512,858 B2 * | 1/2003 | Lyon et al. | 382/305 |
| 6,778,216 B1 * | 8/2004 | Lin | 348/333.11 |
| 6,867,803 B1 | 3/2005 | Funamoto | |
| 6,933,970 B2 * | 8/2005 | Koshiba et al. | 348/273 |
| 7,003,040 B2 * | 2/2006 | Yi | 375/240.24 |
| 2002/0071037 A1 * | 6/2002 | Haavisto | 348/207 |
| 2003/0223649 A1 * | 12/2003 | Findlater et al. | 382/298 |
| 2005/0036046 A1 * | 2/2005 | Atsum | 348/264 |

FOREIGN PATENT DOCUMENTS

| | | |
|---|---|---|
| FI | 20030045 | 1/2003 |
| FI | 20035162 | 9/2003 |
| JP | 2000 224604 | 8/2000 |
| JP | 2003 134193 | 5/2003 |
| WO | WO 02/13510 | 2/2002 |

OTHER PUBLICATIONS

U.S. Appl. No. 10/755,868, filed Jan. 13, 2003, Kalevo.

* cited by examiner

*Primary Examiner*—Lin Ye
*Assistant Examiner*—Gevell Selby
(74) *Attorney, Agent, or Firm*—Ware, Fressola, Van Der Sluys & Adolphson

(57) ABSTRACT

This invention describes horizontal and vertical downscaling of the real-time video image using a camera sensor and a processing block (a base band engine in camera-phone mobile devices) for a real-time viewfinder display and/or video imaging. Horizontal downscaling is performed by the camera sensor and vertical downscaling is performed by the processing block. The invented image format enables the reduction of memory, processing power and bus capability, when the smaller resolution output image is needed to process from the higher resolution input image.

25 Claims, 5 Drawing Sheets

|   | 0 | 1 | 2 | 3 |   | m-2 | m-1 |
|---|---|---|---|---|---|---|---|
| 0 | g(0,0) | r(0,1) | g(0,2) | r(0,3) | ... | g(0,m-2) | r(0,m-1) |
| 1 | b(1,0) | g(1,1) | b(1,2) | g(1,3) |  | b(1,m-2) | g(1,m-1) |
| 2 | g(2,0) | r(2,1) | g(2,2) | r(2,3) |  |  |  |
| 3 | b(3,0) | g(3,1) | b(3,2) | g(3,3) |  |  |  |
|   | ... |  |  |  |  | ... |  |
| n-2 | g(n-2,0) | r(n-2,1) |  | ... |  | g(n-2,m-2) | r(n-2,m-1) |
| n-1 | b(n-1,0) | g(n-1,1) |  |  |  | b(n-1,m-2) | g(n-1,m-1) |

Figure 3

|   | 0 | 1 | | M-2 | M-1 |
|---|---|---|---|---|---|
| 0 | R(0,0)<br>G(0,0) | R(0,1)<br>G(0,1) | ... | R(0,M-2)<br>G(0,M-2) | R(0,M-1)<br>G(0,M-1) |
| 1 | B(1,0)<br>G(1,0) | B(1,1)<br>G(1,1) | | B(1,M-2)<br>G(1,M-2) | B(1,M-1)<br>G(1,M-1) |
| | ... | | | ... | |
| n-2 | R(n-2,0)<br>G(n-2,0) | R(n-2,1)<br>G(n-2,1) | ... | R(n-2,M-2)<br>G(n-2,M-2) | R(n-2,M-1)<br>G(n-2,M-1) |
| n-1 | B(n-1,0)<br>G(n-1,0) | B(n-1,1)<br>G(n-1,1) | | B(n-1,M-2)<br>G(n-1,M-2) | B(n-1,M-1)<br>G(n-1,M-1) |

Figure 4

|   | 0 | 1 | | M-2 | M-1 |
|---|---|---|---|---|---|
| 0 | R'(0,0)<br>G'(0,0)<br>B'(0,0) | R'(0,1)<br>G'(0,1)<br>B'(0,1) | ... | R'(0,M-2)<br>G'(0,M-2)<br>B'(0,M-2) | R'(0,M-1)<br>G'(0,M-1)<br>B'(0,M-1) |
| 1 | R'(1,0)<br>G'(1,0)<br>B'(1,0) | R'(1,1)<br>G'(1,1)<br>B'(1,1) |  | R'(1,M-2)<br>G'(1,M-2)<br>B'(1,M-2) | R'(1,M-1)<br>G'(1,M-1)<br>B'(1,M-1) |
|  | ... |  |  |  | ... |
| N-2 | R'(N-2,0)<br>G'(N-2,0)<br>B'(N-2,0) | R'(N-2,1)<br>G'(N-2,1)<br>B'(N-2,1) |  | R'(N-2,M-2)<br>G'(N-2,M-2)<br>B'(N-2,M-2) | R'(N-2,M-1)<br>G'(N-2,M-1)<br>B'(N-2,M-1) |
| N-1 | R'(n-1,0)<br>G'(N-1,0)<br>B'(N-1,0) | R'(N-1,1)<br>G'(N-1,1)<br>B'(N-1,1) | ... | R'(N-1,M-2)<br>G'(N-1,M-2)<br>B'(N-1,M-2) | R'(N-1,M-1)<br>G'(N-1,M-1)<br>B'(N-1,M-1) |

Figure 5

CAMERA OUTPUT FORMAT FOR REAL TIME VIEWFINDER/VIDEO IMAGE

FIELD OF THE INVENTION

This invention generally relates to formating of a real-time video image in electronic devices and more specifically to horizontal and vertical downscaling of the real-time video image using a camera sensor and a processing block.

BACKGROUND OF THE INVENTION

Field of Technology and Background

A camera sensor is used when still image or video are captured. The output image of the camera sensor can use different image formats e.g. RGB8:8:8, RGB5:6:5, YUV4:2:2, YUV4:2:0, or raw-Bayer image. When the image is displayed on a viewfinder (VF), which usually has a smaller resolution than the camera sensor, the image has to be read from the camera sensor and down-sampled (or downscaled) to the display resolution. When the video image is encoded the resolution of the video frame is also usually smaller than the sensor resolution. Therefore, some kind of downscaling is required. So far the problem of downscaling of a high-resolution image to a low-resolution image was solved by a number of methods which are listed below:

1) Sending the high-resolution result image using e.g. YUV4:2:2 or RGB8:8:8 image format to the processing unit and doing processing there;

2) Down-sampling the high-resolution result image in camera sensor's hardware to the low-resolution result image and then sending the low-resolution result image using e.g. YUV4:2:0 or RGB5:6:5 image format to processing unit (this kind of solution is used e.g. in 7650 and 3650 Nokia mobile phones);

3) Sending the sensor's high-resolution raw-Bayer image to the processing unit and doing all the required processing there.

The above downscaling solutions require a significant amount of memory, processing power and bus capability and further improvements are needed.

SUMMARY OF THE INVENTION

The object of the present invention is to provide a simplified methodology for downscaling of the real-time video image using a camera sensor and a processing block.

According to a first aspect of the present invention, a method for generating a real-time vertically and horizontally downscaled video signal of a video image by an image generating and processing block comprises the steps of: generating a real-time video signal of the video image by a camera sensor of the image generating and processing block; generating a real-time horizontally downscaled video signal using horizontal downscaling of the real-time video signal by the camera sensor; and generating the real-time vertically and horizontally downscaled video signal using vertical downscaling of the real-time horizontally downscaled video signal by a processing block of the image generating and processing block. Further, the camera sensor may have a camera memory. Still further, the processing block may have a processing memory.

In further accord with the first aspect of the invention, before the step of generating a real-time vertically and horizontally downscaled video signal, the method further comprises the step of providing said real-time horizontally downscaled video signal from the camera sensor to the processing block through a camera compact port (CCP) bus of the image generating and processing block.

Still further according to the first aspect of the invention, the method further comprises the step of providing the real-time vertically and horizontally downscaled video signal indicative of the video image through an internal bus to a real-time viewfinder display and displaying said video image on the real-time viewfinder display. Further, the image generating and processing block may be a part of a camera-phone mobile device. Still further, the processing block may be a base band (BB) engine of the camera-phone mobile device. Yet still further, the method may further comprise the steps of: encoding the real-time vertically and horizontally downscaled video signal by a video packing block of the image generating and processing block, thus generating an encoded video signal; and providing said encoded video signal through a further internal bus optionally to a file/stream block and to a phone memory of the camera-phone mobile device.

Further still according to the first aspect of the invention, the method may further comprise the step of encoding the vertically and horizontally downscaled video signal by a video packing block of the image generating and processing block, thus generating an encoded video signal.

According to a second aspect of the invention, an image generating and processing block comprises: a camera sensor, responsive to a video image, for generating a real-time video signal of the video image and for further generating a real-time horizontally downscaled video signal using horizontal downscaling of the real-time video signal by the camera sensor; and a processing block, responsive to the real-time horizontally downscaled video signal, for generating a real-time vertically and horizontally downscaled video signal using vertical downscaling of the real-time horizontally downscaled video signal. Further, the camera sensor may have a camera memory. Still further, the processing block may have a processing memory.

According further to the second aspect of the invention, the image generating and processing block further comprises a camera compact port (CCP) bus, responsive to the real-time horizontally downscaled video signal from the camera sensor, for providing the real-time horizontally downscaled video signal to the processing block.

Further according to the second aspect of the invention, the receiving terminal is further responsive to a software request command by a user, provides a message retrieval request signal containing a terminal signal indicative of a terminal information and optionally a multipurpose internet mail extensions (MIME) signal indicative of a terminal-specific MIME information, provides a software request signal to an Internet server, provides a URL image signal to the user, and renders the further multimedia message signal indicative of the multimedia message perceptible by the user. Also, the receiving terminal may be responsive to a message notification signal.

Still further according to the second aspect of the invention, the system further comprises a sending terminal, for providing a multimedia message signal to the multimedia messaging service center.

According to a third aspect of the invention, a camera-phone mobile device, comprises: an image generating and processing block for generating a real-time vertically and horizontally downscaled video signal of a video image, and for encoding said real-time vertically and horizontally downscaled video signal thus generating an encoded video signal; and a real-time viewfinder display, responsive to the real-time vertically and horizontally downscaled video signal, for providing a display of the video image indicative by said real-time vertically and horizontally downscaled video signal.

In further accordance with the third aspect of the invention, a camera-phone mobile device, may further comprise: a file/stream block, responsive to the encoded signal, for providing a call connection to other mobile devices; and a phone memory, responsive to the encoded signal, for providing the encoded signal.

Yet further still according to the third aspect of the invention, the image generating and processing block of the camera-phone mobile device comprises: a camera sensor, responsive to the video image, for generating the real-time video signal of the video image and for further generating a real-time horizontally downscaled video signal using horizontal downscaling of the real-time video signal by the camera sensor; and a processing block, responsive to the real-time horizontally downscaled video signal, for generating the real-time vertically and horizontally downscaled video signal using vertical downscaling of the real-time horizontally downscaled video signal. Further, the processing block may be a base band (BB) engine of the camera-phone mobile device. Still further, the camera sensor may have a camera memory. Also further, the processing block may have a processing memory. Also still further, the camera-phone mobile device may further comprise a camera compact port (CCP) bus, responsive to the real-time horizontally downscaled video signal from the camera sensor, for providing the real-time horizontally downscaled video signal to the processing block.

This invented image format offers the possibility to process the image as much as possible in the camera sensor without additional memory and using as little processing power as possible. Also the amount of the transmitted image information is reduced as much as possible and at the same time the phase of the color components in the same line are equalized. This phase equalization and data reduction offer the high-quality result image processing with minimal processing power requirements in the processing block. The invented image format enables the reduction of memory, processing power and bus capability, when the smaller resolution output image is needed to process from the higher resolution input image.

BRIEF DESCRIPTION OF THE DRAWINGS

For a better understanding of the nature and objects of the present invention, reference is made to the following detailed description taken in conjunction with the following drawings, in which:

FIG. 3 shows an example of a raw-Bayer n×m video image generated by a camera sensor and used for downscaling, according to the present invention.

FIG. 4 shows an example of a horizontally downscaled n×M video image generated using horizontal downscaling of a real-time video image signal by a camera sensor, according to the present invention.

FIG. 5 shows an example of a vertically and horizontally downscaled N×M video image generated using vertical downscaling of a horizontally downscaled n×M video image by a processing block, according to the present invention.

BEST MODE FOR CARRYING OUT THE INVENTION

The present invention provides a methodology for generating a real-time vertically and horizontally downscaled video signal of a real-time video signal generated by a camera sensor by, first, generating a real-time horizontally downscaled video signal by said camera sensor, second, providing said real-time horizontally downscaled video signal to the processing block through a bus (e.g., compact camera port, CCP, bus) and, third, generating the real-time vertical downscaling of said horizontally downscaled video signal by said processing block.

Figure 1:
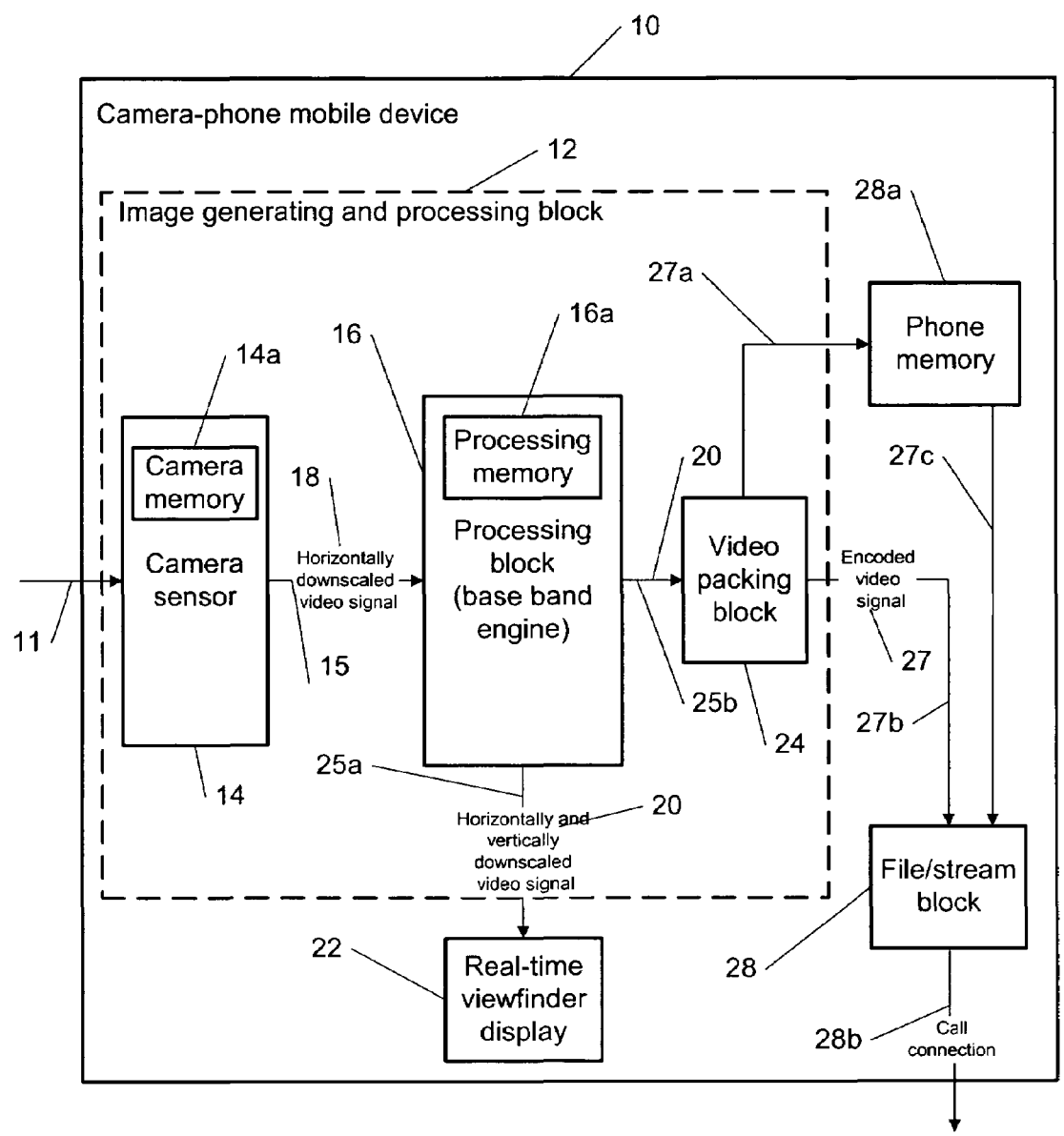
FIG. 1 is a block diagram representing an example of a camera-phone mobile device utilizing an image generating and processing block for generating and processing a real-time vertically and horizontally downscaled video signal, according to the present invention.

FIG. 1 is a block diagram representing only one example among many others of a camera-phone mobile device 10 utilizing an image generating and processing block 12 for generating and processing a real-time vertically and horizontally downscaled video signal, according to the present invention.

The camera sensor 14 of the image generating and processing block 12 generates a real-time video signal in response to a video image 11. Said real-time video signal is horizontally downscaled by said camera sensor 14 requiring insignificant processing capabilities. A small capacity camera memory 14a within the camera sensor 14 is used for assisting of said horizontal downscaling performed by the camera sensor 14, which produces a horizontally downscaled video signal 18. An algorithm of horizontal downscaling is discussed below in details regarding FIG. 4. Then said horizontally downscaled video signal 18 from the camera sensor 14 is provided to a processing block 16 of the image generating and processing block 12 through a compact camera port (CCP) bus 15.

The processing block 16 generates a real-time vertically and horizontally downscaled video signal 20 using vertical downscaling of the real-time horizontally downscaled video signal 18. A small capacity processing memory 16a within the processing block 16 is used for assisting of said vertical downscaling performed by the processing block 16. An algorithm of the vertical downscaling is discussed below in details regarding FIG. 5. For the example of the camera-phone mobile device 10 presented in FIG. 1, the processing block 16 is practically a base band engine which performs statistic collection for color correction, correction of colors, and possible other processes related to image quality in addition to said vertical downscaling.

The real-time vertically and horizontally downscaled video signal 20 indicative of the video image 11 is provided (optionally) through an internal bus 25a to a real-time viewfinder display 22 of the camera-phone mobile device 10 for displaying said video image 11 on said real-time viewfinder display 22. The real-time vertically and horizontally downscaled video signal 20 is also provided (again optionally) through an internal bus 25b to a video packing block 24 of the image generating and processing block 24, said video packing block 24 generates an encoded video signal 27 from the real-time vertically and horizontally downscaled video signal 20. The video packing block 24 can be a part of the base band engine 16, according to the present invention. Finally the encoded video signal 27 is provided to a phone memory 28a and/or to a file/stream block 28 of the camera-phone mobile device 10 through further internal buses 27a, 27b and 27c, respectively, and possibly sent to other phone through a phone connection 28b.

This invention can optionally require also bit companding when the image information is transferred between the camera sensor 14 and processing unit 16. This companding can be done using e.g. gamma based look-up-table (LUT). Even better companding solution can be utilizing the method described in invention "High Quality Codec from N bits to M Bits Using Fixed Length Codes" by Kalevo, submitted as patent application in Finland (FI application number 20030045, filed on Jan. 13, 2003). Said companding, if necessary, is implemented by the camera sensor 14 and uncompanding is performed by the processing block 16, respectively.

There are a number of possible variations of the application shown in FIG. 1. For example, when the actual still image is processed, Nokia Image Processing System (NIPS) can be used by the processing block 16. Additionally, for video and viewfinder images some auto white balance (AWB) solution, e.g., described in invention "Automatic Color Balance Adjustment for Digital Cameras" by Kalevo et al., submitted as patent application in Finland (FI application number 20035162, filed on Sep. 24, 2003) can be used as well. It is also possible to do specific image corrections only for the image to be shown on the real-time viewfinder display 22 at the same time as color correction in the processing block 16, but not for the image, which is entering the video coding in the video packing block 24. The vertical downscaling can also be performed by the camera sensor 14, such that the camera sensor output can be a horizontally and vertically downscaled signal but it is still a raw image without any corrections. Finally, it is noted that the horizontally and vertically downscaled image can also be sent using 4-color component values at the same pixel location instead of 3-color component values shown in FIG. 5 and described below. This 4-color component values approach assumes, for example, sending two G-components (G in red line and G in blue line) by the camera sensor 14 separately and combining them later in the processing block 16.

Figure 2:
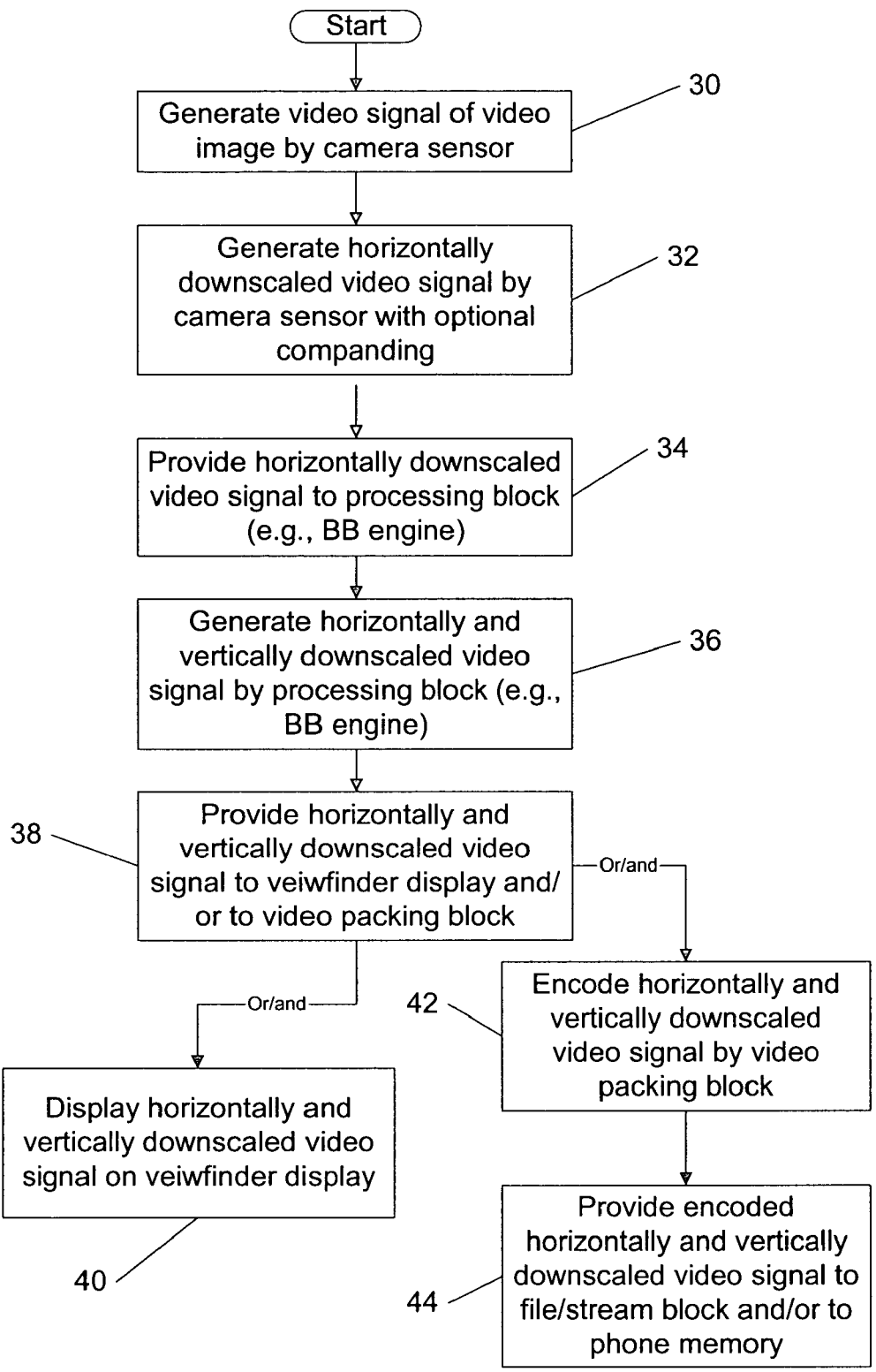
FIG. 2 shows a flow chart for generating and processing of a real-time vertically and horizontally downscaled video signal, according to the present invention.

FIG. 2 shows a flow chart for generating and processing of a real-time vertically and horizontally downscaled video signal according to the present invention. The flow chart of FIG. 2 only represents one possible scenario among others. In a method according to the present invention, in a first step 30, the real-time video signal of the video image 11 is generated by the camera sensor 14. In a next step 32, the horizontally downscaled video signal 18 is generated by the camera sensor 14 with optional companding as mentioned above. In a next step 34, horizontally downscaled video signal 18 is provided to the processing block 16 (e.g., BB engine of the camera-phone mobile device). In a next step 36, the horizontally and vertically downscaled video signal 20 is generated by the processing block 16 (e.g., BB engine) by vertical downscaling of the horizontally downscaled video signal 18.

In a next step 38, the horizontally and vertically downscaled video signal 20 is provided to the real-time viewfinder display 22 and/or to the video packing block 24. In a next step 40, the horizontally and vertically downscaled video signal 20 is displayed (optionally) on the real-time viewfinder display 22. In a next step 42, the horizontally and vertically downscaled video signal 20 is encoded (optionally) by the video packing block 24, forming the encoded video signal 27. Finally, in a next step 44, the encoded video signal 27 is provided to the phone memory 28a and/or to the file/stream block 28 for call connection to other mobile devices.

FIGS. 3-5 demonstrate an example among many others of how the VGA-resolution raw-Bayer image generated by the camera sensor 14 can be processed to the QQVGA-resolution image format, according to the present invention. In particular, FIG. 3 shows an example of a VGA-resolution raw-Bayer n×m (number of columns m=640 and number of lines n=480) video image generated by the camera sensor 14 and used for downscaling by said camera sensor 14, wherein g, r and b correspond to standard color components (green, red and blue) with indexes in parentheses identifying a line number (from 0 to n−1) and a column number (from 0 to m−1).

FIG. 4 shows an example of a horizontally downscaled n×M video image generated using horizontal downscaling of a real-time video image signal by a camera sensor 14, according to the present invention, wherein G, R and B corresponds to standard color components (green, red and blue) with indexes in parentheses identifying the line number (from 0 to n×1) and a downscaled column number (from 0 to M−1).

Image of FIG. 4 consists of even and odd numbered lines. For each line only two color component pixel values are available from the three available color component pixel values of the original video image of FIG. 3. For example, the even lines consist of R and G color component pixel values and the odd lines consist on B and G color component pixel values. Two color component values in the same line are in the same phase. This means that for each pixel position there are two colour component pixel values available. E.g. even line pixels can be presented as R(0,0), G(0,0), R(0,1), G(0,1), R(0,2), G(0,2,) ..., R(0,M−1) and G(0,M−1), where M is the number of the pixels in line. So the total amount of the pixel components in the line is 2×M. This M value is typically 128 (sub-QCIF), 160 (QQVGA), 176 (QCIF), 320 (QVGA) or 352 (CIF). Also the pixel component phases in odd and even lines are the same in horizontal direction. This means that, for example, the B(1,0) and G(1,0) pixels in the $1^{st}$ (n=1) line are the same as the R(0,0), G(0,0), R(2,0) and G(2,0), pixels in $0^{th}$ (n=0) and $2^{nd}$ (n=2) lines, respectively. It is noted, that according to the present invention, when the pixels in the lines (horizontally downscaled video signal 18) are transmitted through the information channel (CCP bus 15) the order of the pixels in the same position has to be specified: when the even line is transmitted, the order of pixels, e.g. for the $0^{th}$ line, is G(0,0), R(0,0), G(0,1), R(0,1), etc., and when the odd line is transmitted the order of pixels, e.g. for the $1^{st}$ line, is B(1,0), G(1,0), B(1,1), G(1,1) etc.

For the QQVGA-resolution image format, the image ratio is Min(m/M, n/N)=Min(640/160, 480/120)=4. This means that one pixel in invented image format in horizontal or vertical direction corresponds to the distance in raw-Bayer image of 4 pixels. The optimal first position, which utilizes the whole image information in horizontal direction in FIG. 4, is between pixels 1 and 2 (1.5). This means that the output pixel values can be calculated as follows:

Even Lines:

$$G(0,0)=(3g(0,0)+4g(0,2)+g(0,4))/8,$$

$$R(0,0)=(r(0,-1)+4r(0,1)+3r(0,3))/8,$$

$$G(0,1)=(3g(0,4)+4g(0,6)+g(0,8))/8,$$

$$R(0,1)=(r(0,3)+4r(0,5)+3r(0,7))/8, \text{etc.};$$

Odd Lines:

$$B(1,0)=(3b(1,0)+4b(1,2)+b(1,4))/8,$$

$$G(1,0)=(g(1,-1)+4*g(1,1)+3g(1,3))/8,$$

$$B(1,1)=(3b(4)+4b(6)+b(8))/8,$$

$$G(1,1)=(g(1,3)+4g(1,5)+3g(1,7))/8, \text{etc.}$$

The phase of the pixels can be selected differently. E.g., if the computational complexity is needed to be minimized, the position of the first pixel can be selected to be (0,1). This means that the output values can be calculated as follows:

Even Lines:

$G(0,0)=(g(0,0)+g(0,2))/2,$ $R(0,0)=(r(0,-1)+2r(0,1)+r(0,3))/4,$ $G(0,1)=(g(0,4)+g(0,6))/2,$ $R(0,1)=(r(0,3)+2r(0,5)+r(0,7))/4,$ etc.;

Odd Lines:

$B(1,0)=(b(1,0)+b(1,2))/2,$ $G(1,0)=(g(1,-1)+2g(1,1)+g(1,3))/4,$ $B(1,1)=(b(4)+b(6))/2,$ $G(1,1)=(g(1,3)+2g(1,5)+g(1,7))/4,$ etc.

The values of r(0,−1) and g(1,−1) and other pixel values with negative indexes correspond to the red and green component values of the pixels lying on the left side of the pixels (0,0), (1,0), . . . , (n−1,0), respectively. If there is no value for these marginal pixels, the value for pixels (0,0), (1,0), . . . , (n−1,0) or (0,1), (1,1), . . . , (n−1,1) depending on the component's color can be used instead, respectively.

The horizontal downscaling described above is done in camera sensor 14 and it does not require line memories. After downscaling, the horizontally downscaled video signal 18 is transmitted to the processing block 16 through the CCP bus 15 as described above and the vertical downscaling is done in the processing block 16. The result image format is shown in FIG. 5. Thus FIG. 5 shows an example of a vertically and horizontally downscaled N×M video image (e.g., RGB8:8:8 format) generated using vertical downscaling of a horizontally downscaled n×M video image of FIG. 4 by a processing block 16, according to the present invention.

Again, for the image format for N×M image (RGB8:8:8) of QQVGA-resolution image format, the optimal first position, which utilises the whole image information in vertical direction, is between pixels 1 and 2. This means that the output pixel values can be calculated as follows:

$R'(0,0)=(3R(0,0)+4R(2,0)+R(4,0))/8,$ $G'(0,0)=(G(-1,0)+3G(0,0)+4G(1,0)+4G(2,0)+3G(3,0)+G(4,0))/16,$ $B'(0,0)=(B(-1,0)+4B(1,0)+3B(3,0))/8$ $R'(1,0)=(3R(4,0)+4R(6,0)+R(8,0))/8,$ $G'(1,0)=(G(3,0)+3G(4,0)+4G(5,0)+4G(6,0)+3G(7,0)+G(8,0))/16,$ $B'(1,0)=(B(3,0)+4B(5,0)+3B(7,0))/8,$ etc.

The phase of the pixels can be selected differently. E.g., if the computational complexity is needed to be minimized, the position of the first pixel can be selected to be (1,0). This means that the output values can be calculated as follows:

$R'(0,0)=(R(0,0)+R(2,0))/2,$ $G'(0,0)=(G(-1,0)+2G(0,0)+2G(1,0)+2G(2,0)+G(3,0))/8,$ $B'(0,0)=(B(-1,0)+2B(1,0)+B(3,0))/4$ $R'(1,0)=(R(4,0)+R(6,0))/2,$ $G'(1,0)=(G(3,0)+2G(4,0)+2G(5,0)+2G(6,0)+G(7,0))/8,$ $B'(1,0)=(B(3,0)+2B(5,0)+B(7,0))/4,$ etc.

The values of; G (−1,0), B(−1,0) and other pixel values with negative indexes correspond to the green and blue component values of the pixels lying on the upper side of the pixels (0,0), (0,1), . . . , (0,M−1), respectively. If there is no value for this marginal pixels, the value for pixel (0,0), (0,1), . . . , (0,M−1) or (1,0), (1,1), . . . , (1,M−1) depending on the component's color can be used instead, respectively.

When the amount of pixels is correct and all the pixels are containing all the color component values, minimally only the AWB (with linearization, vignetting elimination, color gamut conversion and gamma mapping) is additionally required when the high quality result image is processed.

The situation is slightly more complicated when e.g. the VGA raw-Bayer image is used for the QCIF-video. In this scenario the image ratio (Min(640/176, 480/144)=Min(40/11, 10/3)=10/3) is not an integer value. Also it is obvious that the image (aspect) ratios in horizontal and vertical directions are not equal and, therefore, part of the image is discarded when the downscaling is done as further explained below. In this case the set of pixels on the left and right sides of the image are not used.

It is noticed that in this example it is desirable to keep the aspect ratio equal so the scaling ratio for the horizontal and vertical directions is the same. In some cases the aspect ratio can also be changed (e.g., full image information is used) or have to be changed (e.g., from a progressive image sensor the interlaced image is needed to be used for displaying) and so the scaling ratio for the horizontal and vertical directions can be different as well. Also the cropping of the image can be made before the downscaling as in this example or after said downscaling. The amount of the cropped pixels can also be much higher for both directions and the image zooming for the viewfinder or video image can be applied by changing the scaling ratio as well.

Thus in this case the amount of the used pixels is M*n/N=586.66. Then the first pixel horizontal position is optimally placed in the raw-Bayer image position (m−M*n/N)/2+(n/N)/2−1/2=27.833. Also the processing window moves such that after 3 processed output pixel values 10-pixel shift in the input image is performed. In the example below the horizontal downscaling from VGA to QCIF is done and the first pixel position is selected to be 27.666. Then the downscaled output pixel values can be calculated as follows:

Even Lines:

$G(0,0)=(3g(0,26)+6g(0,28)+g(0,30))/10,$ $R(0,0)=(6r(0,27)+4r(0,29))/10,$ $G(0,1)=(5g(0,30)+5g(0,32))/10,$ $R(0,1)=(2r(0,29)+6r(0,31)+2r(0,33))/10,$ $G(0,2)=(g(0,32)+6g(0,34)+3g(30,6))/10,$ $R(0,2)=(4r(0,33)+6r(0,35))/10,$ $G(0,3)=(3g0,(36)+6g(0,38)+g(0,40))/10,$ $R(0,3)=(6r(0,37)+4r(0,39))/10,$ etc.

Odd Lines:

$B(1,0)=(3b(1,26)+6b(1,28)+b(1,30))/10,$ $G(1,0)=(6g(1,27)+4g(1,29))/10,$ $B(1,1)=(5b(1,30)+5b(1,32))/10,$ $G(1,1)=(2g(1,29)+6g(1,31)+2g(1,33))/10,$ $B(1,2)=(b(1,32)+6b(1,34)+3b(1,36)),$ $G(1,2)=(4g(1,33)+6g(1,35))/10,$ $B(1,3)=(3b(1,36)+6b(1,38)+b(1,40)),$ $G(1,3)=(6g(1,37)+4g(1,39))/10,$ etc.

Another example is how one mega-pixel image (1152×864) can be downscaled horizontally to the QQVGA image. In this scenario the image ratio is 7.2 (1152/160=864/120=36/5), and the first pixel position selected to be optimal is 3.1 ((864/120)/2−1/2). In this case after 5 processed output pixel values 36-pixel shift in input image is performed. This example shows only the processing of even line pixels as follows:

$G(0,0)=(15g(0,0)+20g(0,2)+20g(0,4)+17g(0,6))/72$ $R(0,0)=(5r(0,-1)+20r(0,1)+20r(0,3)+20*0r(0,5)+7r(0,7))/72$ $G(0,1)=(3g(0,6)+20g((0,8)+20g(0,10)+20g(0,12)+9g(0,14))/72$ $R(0,1)=(13r(0,7)+20r(0,9)+20r(0,11)+19r(0,13))/72$ $G(0,2)=(11g(0,14)+20g(0,16)+20g(0,18)+20g(0,20)+1g(0,22))/72$ $R(0,2)=(r(0,13)+20r(0,15)+20r(0,17)+20r(0,19)+11r(0,21))/72$ $G(0,3)=(19g(0,22)+20g(0,24)+20g(0,26)+13g(0,28))/72$ $R(0,3)=(9r(0,21)+20r(0,23)+20r(0,25)+20r(0,27)+3r(0,29))/72$ $G(0,4)=(7g(0,28)+20g(0,30)+20g(0,32)+20g(0,34)+5g(0,36))/72$ $R(0,4)=(17r(0,29)+20r(0,31)+20r(33)+15r(0,0,35))/72$ $G(0,5)=(15g(0,36)+20g(0,38)+20g(0,40)+17g(0,42))/72$ $R(0,5)=(5r(0,35)+20r(0,37)+20r(0,39)+20r(0,41)+7r(0,43))/72,$ etc.

The vertical downscaling for the above two scenarios is performed in a similar manner as for the horizontal downscaling.

What is claimed is:

1. A method, comprising:
   generating a real-time video signal of the video image by a camera sensor,
   generating a real-time horizontally downscaled video signal using horizontal downscaling of the real-time video signal by the camera sensor using combining weighted pixels values according to a predetermined algorithm, and
   generating a real-time vertically and horizontally downscaled video signal using vertical downscaling of the real-time horizontally downscaled video signal by a processing block,
   wherein the horizontal downscaling and the vertical downscaling are performed separately in time.

2. The method of claim 1, wherein said horizontal downscaling is performed without a line memory and before said generating the real-time vertically and horizontally downscaled video signal, the method further comprises:
   providing said real-time horizontally downscaled video signal from the camera sensor to the processing block through a camera compact port bus of the image generating and processing block.

3. The method of claim 1, further comprising:
   providing the real-time vertically and horizontally downscaled video signal indicative of the video image through an internal bus to a real-time viewfinder display and displaying said video image on the real-time viewfinder display.

4. The method of claim 1, wherein the image generating and processing block is a part of a camera-phone mobile device and the method further comprises:
   encoding the real-time vertically and horizontally downscaled video signal by a video packing block of the image generating and processing block for generating an encoded video signal, and
   providing said encoded video signal through a further internal bus to at least one of: a file/stream block and a phone memory of the camera-phone mobile device.

5. The method of claim 1, further comprising:
   encoding the vertically and horizontally downscaled video signal by a video packing block of the image generating and processing block for generating an encoded video signal.

6. The method of claim 1, wherein pixel color components of a downscaled image comprised in said real-time horizontally downscaled video signal have substantially equal phases.

7. An image generating and processing block, comprising:
   a camera sensor, responsive to a video image, configured to generate a real-time video signal of the video image and further configured to generate a real-time horizontally downscaled video signal using horizontal downscaling of the real-time video signal using combining weighted pixels values according to a predetermined algorithm; and
   a processing block, responsive to the real-time horizontally downscaled video signal, configured to generate a real-time vertically and horizontally downscaled video signal using vertical downscaling of the real-time horizontally downscaled video signal,
   wherein the horizontal downscaling and the vertical downscaling are performed separately in time.

8. The image generating and processing block of claim 7, wherein the camera sensor comprises a camera memory.

9. The image generating and processing block of claim 7, wherein the processing block comprises a processing memory.

10. The image generating and processing block of claim 7, wherein said horizontal downscaling is performed without a line memory and the image generating and processing block further comprises:
   a camera compact port bus, responsive to the real-time horizontally downscaled video signal from the camera sensor, configured to provide the real-time horizontally downscaled video signal to the processing block.

11. The image generating and processing block of claim 7, wherein pixel color components of a downscaled image comprised in said real-time horizontally downscaled video signal have substantially equal phases.

12. A camera-phone mobile device, comprising:
   an image generating and processing block configured to generate a real-time vertically and horizontally downscaled video signal of a video image, and configured to encode said real-time vertically and horizontally downscaled video signal for generating an encoded video signal, wherein said real-time vertically and horizontally downscaled video signal is horizontally downscaled first and separate from vertical downscaling to provide a real-time horizontally downscaled video signal using combining weighted pixels values according to a predetermined algorithm without using a line memory; and
   a real-time viewfinder display, responsive to the real-time vertically and horizontally downscaled video signal, configured to provide a display of the video image indicative by said real-time vertically and horizontally downscaled video signal.

13. The camera-phone mobile device of claim 12, further comprising:
   a file/stream block, responsive to the encoded signal, configured to provide a call connection to other mobile devices; and
   a phone memory, responsive to the encoded signal, configured to provide the encoded signal.

14. The camera-phone mobile device of claim 12, wherein the image generating and processing block comprises:
   a camera sensor, responsive to the video image, configured to generate the real-time video signal of the video image and further configured to generate said real-time horizontally downscaled video signal using horizontal downscaling of the real-time video signal; and
   a processing block, responsive to the real-time horizontally downscaled video signal, configured to generate the real-time vertically and horizontally downscaled video signal using vertical downscaling of the real-time horizontally downscaled video signal.

15. The camera-phone mobile device of claim 14, wherein the processing block is a base band engine of the camera-phone mobile device.

16. The camera-phone mobile device of claim 14, wherein the camera sensor comprises a camera memory.

17. The camera-phone mobile device of claim 14, wherein the processing block comprises a processing memory.

18. The camera-phone mobile device of claim 14, further comprising:
   a camera compact port bus, responsive to the real-time horizontally downscaled video signal from the camera sensor, configured to provide the real-time horizontally downscaled video signal to the processing block.

19. The camera-phone mobile device of claim 12, wherein the image generating and processing block comprises:
   a camera sensor, responsive to the video image, configured to generate the real-time video signal of the video image and further configured to generate said real-time horizontally downscaled video signal using horizontal downscaling of the real-time video signal and is still further configured to generate a real-time vertically and horizontally downscaled video signal using vertical downscaling of the real-time horizontally downscaled video signal.

20. A method, comprising:
   generating a real-time video signal of the video image by a camera sensor; and
   generating a real-time horizontally downscaled video signal using horizontal downscaling of the real-time video signal by the camera sensor using combining weighted pixels values in the same row according to a predetermined algorithm without using a line memory,
   wherein the horizontal downscaling is performed separately in time from vertical downscaling.

21. The method of claim 20, further comprising:
   generating a real-time vertically and horizontally downscaled video signal using vertical downscaling of the real-time horizontally downscaled video signal by said camera sensor or by a processing block of the image generating and processing block.

22. The method of claim 21, wherein pixel color components of a downscaled image comprised in said real-time horizontally downscaled video signal have substantially equal phases.

23. An electronic device, comprising:
   a camera sensor, configured to generate a real-time video signal of the video image and further configured to generate a real-time horizontally downscaled video signal using horizontal downscaling of the real-time video signal by the camera sensor using combining weighted pixels values in the same row according to a predetermined algorithm without using a line memory,
   wherein the horizontal downscaling is performed separately in time from vertical downscaling.

24. The electronic device of claim 23, wherein said camera sensor is still further configured to generate a real-time vertically and horizontally downscaled video signal using vertical downscaling of the real-time horizontally downscaled video signal.

25. The electronic device of claim 23, wherein pixel color components of a downscaled image comprised in said real-time horizontally downscaled video signal have substantially equal phases.

* * * * *